United States Patent [19]
Stehle et al.

[11] Patent Number: 5,533,423
[45] Date of Patent: Jul. 9, 1996

[54] DIFFERENTIAL HOUSING FOR THE AXLE DRIVE OF A MOTOR VEHICLE

[75] Inventors: Heinz Stehle, Weissach; Peter Hoebel, Neuhausen, both of Germany

[73] Assignee: Dr. Ing.h.c.F. Porsche AG, Weissach, Germany

[21] Appl. No.: 239,914

[22] Filed: May 9, 1994

[30] Foreign Application Priority Data

May 21, 1993 [DE] Germany ............................ 43 17 073.0

[51] Int. Cl.$^6$ ................................................. F16H 57/02
[52] U.S. Cl. ........................................ 74/606 R; 475/246
[58] Field of Search ............................ 74/606 R; 475/246

[56] References Cited

U.S. PATENT DOCUMENTS

| | | | |
|---|---|---|---|
| 3,323,844 | 6/1967 | Hedstrom | 475/246 X |
| 5,234,388 | 8/1993 | Nordkvist | 475/246 |
| 5,297,447 | 3/1994 | Massaccesi | 475/246 X |
| 5,363,722 | 11/1994 | Klotz | 74/606 R |

FOREIGN PATENT DOCUMENTS

| | | | |
|---|---|---|---|
| 0375860 | 7/1990 | European Pat. Off. | |
| 225052 | 10/1974 | France | |
| 2293329 | 6/1975 | France | |
| 2378209 | 8/1978 | France | |
| 462127 | 7/1928 | Germany | |
| 1172124 | 6/1964 | Germany | 475/246 |
| 1810520 | 6/1970 | Germany | |
| 2454067 | 5/1976 | Germany | |
| 2639150 | 3/1978 | Germany | 475/246 |
| 1810520 | 6/1978 | Germany | |
| 2653978 | 6/1978 | Germany | |
| 2844918 | 4/1980 | Germany | |
| 6-200990 | 7/1994 | Japan | 475/246 |
| 888263 | 1/1962 | United Kingdom | 475/246 |
| 1461023 | 1/1977 | United Kingdom | |
| 2223068 | 3/1990 | United Kingdom | 475/246 |

Primary Examiner—Vinh T. Luong
Attorney, Agent, or Firm—Evenson McKeown Edwards & Lenahan

[57] ABSTRACT

A differential housing is made up of many parts composed of deep-drawn readily shapable steel sheets. A conical bearing part jacket receives a differential pin and one differential gear. A cover inserted into an opening in the jacket bears an additional differential gear. The housing parts and a drive gear fastened thereto are all connected permanently with one another.

17 Claims, 2 Drawing Sheets

DIFFERENTIAL HOUSING FOR THE AXLE DRIVE OF A MOTOR VEHICLE

BACKGROUND AND SUMMARY OF THE INVENTION

The invention relates to a differential housing for the axle drive of a motor vehicle comprising a drive-gear, at least two rotationally symmetric stamped housing parts, impressed bearing projections for mounting a differential pin, and axle drive shafts extending transversely with respect to the differential pin and having a rotational axis.

A demountable differential housing composed of two identical stamped housing halves is known from German Patent 462127, the connecting flanges of said housing having impressed projections. Two circular projections located radially opposite one another in the assembled state form a bearing lying in the separating plane for a differential pin while a drive gear abuts one half of the housing at a plurality of projections that are closed relative to the circumferential edge of the flange. This gear is held by screw connections which additionally connect the housing halves.

A goal of the invention is to provide a differential housing made of stamped parts which can be manufactured efficiently with simpler design, whereby a high rigidity of the housing is also achieved.

This goal is achieved by providing an arrangement wherein a first one of the housing parts is made in the form of a bearing part provided with a jacket extending essentially at a continuous incline relative to the rotational axis and having a section with the impressed bearing projections for a differential pin wherein a first one of the housing parts is made in the form of a bearing part provided with a jacket extending essentially at a continuous incline relative to the rotational axis and having a section with the impressed bearing projections for a differential pin, wherein the drive gear is mounted on a flange surrounding an opening in the first housing part, said opening being closed by at least one additional housing part formed as a cover.

When a part of the differential housing is designed as bearing part which has a jacket extending essentially continuously inclined relative to the rotational axis of the axle drive shafts, in which jacket the projections for mounting the differential pin are disposed, the conically tapered jacket permits the use of deep-drawn steels, especially readily deformable fine-grain steels. These can be shaped simply and economically on a mass production basis. The opening provided through the conical jacket also allows simple installation of the components to be mounted in the housing. The arrangement of the drive gear on a flange of the bearing part that surrounds the opening ensures a direct power flow into this housing part which has a high degree of rigidity thanks to the closed jacket. This jacket is interrupted only by the projections in which the differential pin is mounted. These projections have no separating plane, so that the torque initiated through the drive gear is transmitted to the differential pin without any possible deformations or displacements of the housing parts bordering such a separating plane.

The opening is closed by at least one cover so that a closed rigid housing results supported in the area of the drive gear.

Advantageously, the bearing part can additionally have a supporting surface which receives the forces of a differential gear acting in the direction of the rotational axis. Thus, in addition to the differential pin holding the compensating gears, one of the differential gears is supported in the bearing part. The supporting surface can be produced when stamping the bearing part, so that no additional manufacturing step is required.

The arrangement of the flange for mounting the drive gear in a radially outward area, because of the relatively large diameter, reduces the forces conducted into the flange by the applied torque.

Advantageously, the cover can have another support surface for a second differential gear, either directly or with interposition of an insert.

In order to mount the differential housing rotatably in simple fashion and economically in an axle housing, both the bearing part and the cover can have sections that run parallel to the rotational axis and are designed as bearing seats.

With increased requirements as to rigidity, especially in the area of the differential pin bearing, a bearing seat can be provided on a separate bushing fastened to the bearing part.

The cover can be made essentially roof-shaped in cross section, whereby the peak of the roof is mounted on an inner surface of the flange bearing the drive gear, and is disposed on one of the bevels of the additional supporting surface.

In order to decrease further the requirements for precision in manufacturing the differential housing, the compensating gears or the differential gear can be mounted at a distance from the inner surface of the jacket or supporting surface, so that the resultant space is filled during assembly by injecting liquid plastic, for example thermoplastic plastic or thermosetting plastic. After the plastic sets, the compensating or differential gears abut the inner surfaces or supporting surfaces with interposition of this plastic. Hence, an exactly fitting and plane running surface for these gears is not required.

Further advantageous simplifications are realized by eliminating one possibility for disassembly by permanently connecting the parts forming the housing with one another or with the drive gear. This dispenses with the otherwise conventional cutting of bolts and threads in the drive gear and in the housing, tightening of bolts, their corresponding tightening torque and rotational angle check, the bolt connection, and the bolts themselves. By avoiding undesirable thermal inertia, connection is preferably accomplished using laser welding so that the conduction of heat into the parts to be connected remains low.

The bushing bearing the bearing seat can be connected economically and simply by friction welding with the bearing part.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
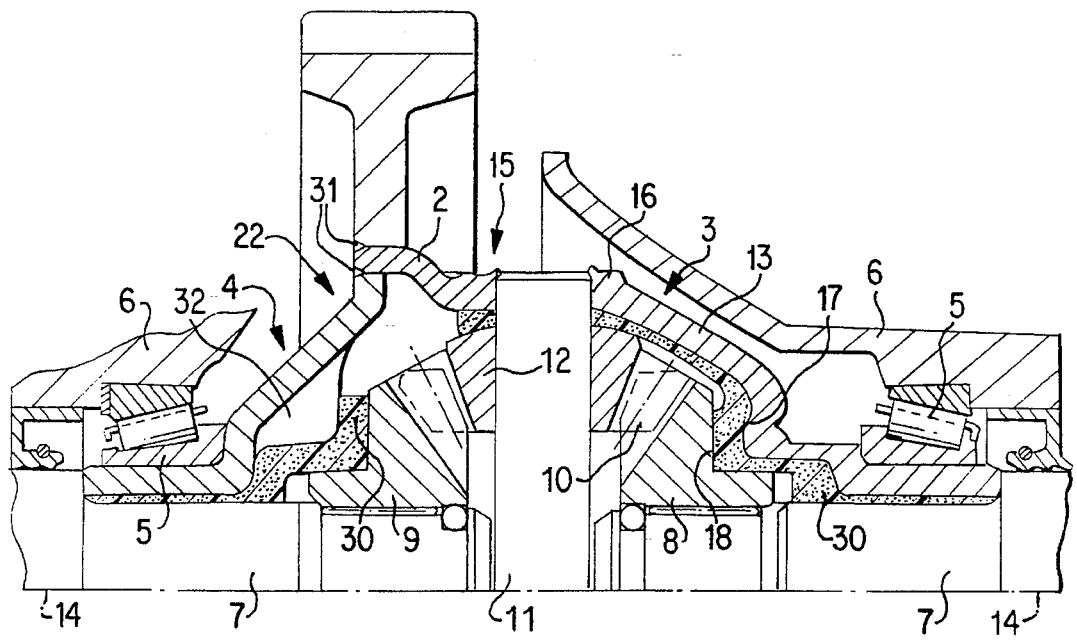
FIG. 1 is a sectional schematic view which shows a differential housing with a drive gear in the axle housing, constructed according to a preferred embodiment of the invention.

Referring to FIG. 1, a differential housing for the axle drive of a motor vehicle has a drive gear in the form of a ring gear 1, permanently mounted on a flange 2 of a bearing part 3. The differential housing formed of bearing part 3 and cover 4 permanently connected therewith is mounted rotatably by bearings 5 in an axle housing 6 shown only partially. Two axle drive shafts 7 connected with vehicle wheels not shown, each bear nonrotatably a differential gear 8, 9 which meshes through bevel gears 10 with compensating gears 12 mounted on a differential pin 11.

Bearing part 3 has a jacket 13 which runs essentially continuously inclined with respect to a rotational axis 14 of shafts 7. Because of the rotationally symmetric design of bearing part 3, jacket 13 has a conical shape.

In one portion 15 of the jacket, punched-out areas designed as projection 16 are stamped, and serve as a bearing for differential pin 11. These projections 16 have a shorter radial distance from axis 14 than does flange 2.

Figure 2:
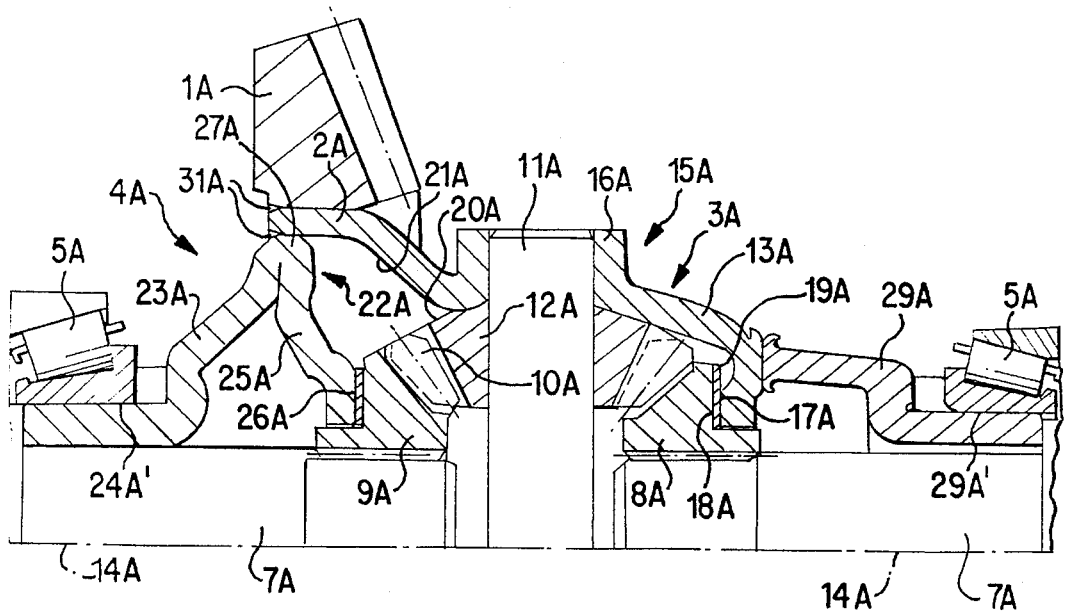
FIG. 2 is a view similar to FIG. 1, showing another pre embodiment of the invention.
Figure 3:
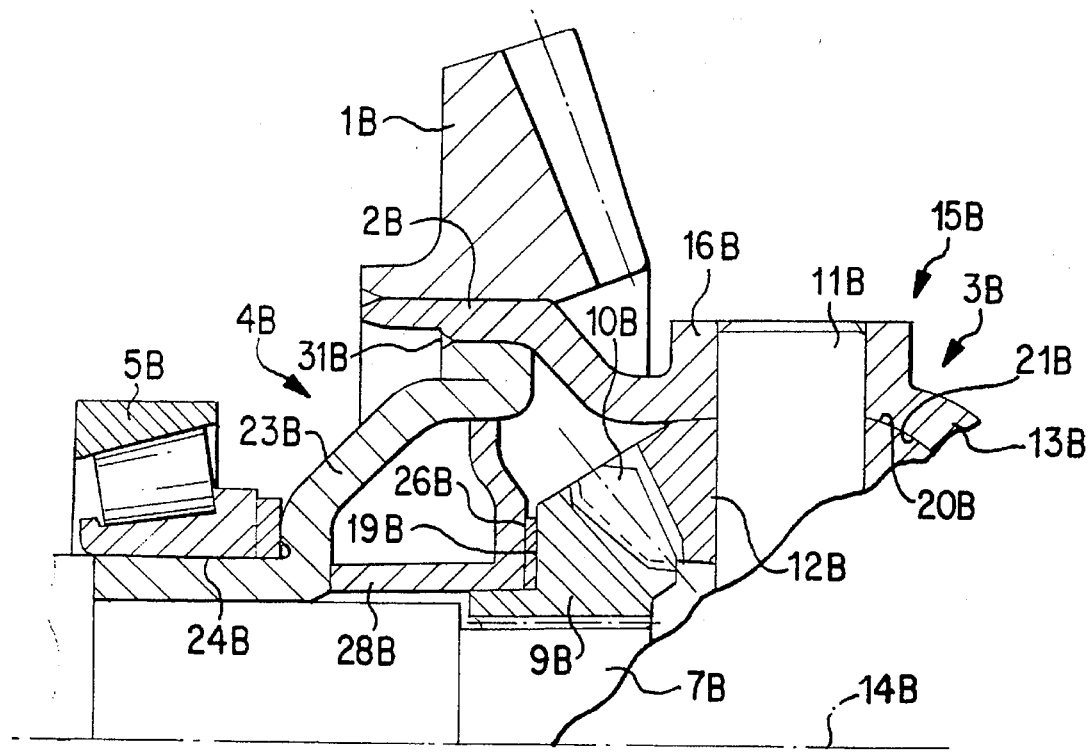
FIG. 3 is a part sectional view showing another embodiment of a differential housing with cover.

In FIG. 2, corresponding reference numbers with suffix "A", as in FIG. 1 are used to designate generally correspondingly functioning parts. In FIG. 3, corresponding reference numbers with suffix "B", as in FIG. 1 are used to designate generally correspondingly functioning parts. Unless otherwise described herein, the description for correspondingly numbered parts in each of FIGS. 1–3 apply to all these Figures.

According to FIG. 2, bearing part 3A has a radially extended supporting surface 17A on which a frictional surface 18A of one differential gear 8A abuts directly or with interposition of a washer 19A. The radially external bearing surfaces 20A of compensating gears 12A, when there is a difference in the rpms (rotational velocity) of the vehicle wheel, slide directly on the inner surface 21A of jacket 13A in the vicinity of projections 16A. The forces that result with a difference in rpm (rotational velocity) abut supporting surface 17A or inner surface 21A in the direction of axis 14A.

Flange 2 surrounds an opening 22A in bearing part 3A closed by the inserted cover 4A. According to FIG. 2, this cover 4A is essentially made roof-shaped in cross section, whereby a bearing seat 24A' running parallel to axis 14A for a bearing 5A is mounted on a bevel 23A. On another bevel 25A there is another supporting surface 26A for second differential gear 9A. A connecting area 27A for the two bevels 23A, 25A, is welded to the inner surface 21A in the vicinity of flange 2A.

In a variation according to FIG. 3, cover 4B has only one bevel 23B which is crimped in the area of flange 2B and welded thereto. Cover 4B has an angular insert 28B on which the additional supporting surface 26B is formed.

Bearing seat 24B, which belongs to the bearings 5B shown at the left in FIGS. 1 and 2, can according to FIG. 3, be formed directly on bearing part 4B. In FIG. 22, a bushing 29A bearing bearing seat 29A' is connected by friction welding and located adjacent to supporting surface 17B as an additional housing part.

According to FIG. 1, differential gears 8, 9 and compensating gears 12 are arranged at a distance from the supporting surfaces 17, 26 associated with them and inner surface 21. The resultant space is filled with a thermoplastic or thermosetting plastic 30. During manufacture, first the gears 8, 9, 12 which mesh with one another are positioned at a desired distance from one another; then the cover 6 is installed with a laser weld 31 and then the space is filled by injecting plastic 30. To reduce the amount of plastic required and for a positive connection with the housing parts, ribs 32 can be provided.

When assembling the differential housing shown in FIGS. 2 and 3, the gears 8A, 8B and 12A, 12B meshing with one another are initially positioned with a desired distance between them. Then, cover 4A, 4B is inserted into opening 22A, 22B until gear pair 9A, 9B, 12A, 12B has the desired amount of play. Then, cover 4A, 4B is fastened by a laser weld 31A, 31B to flange 2A, 2B and ring gear 1A, 1B is pushed onto flange 2A, 2B and welded.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Differential housing and axle drive arrangement for the axle drive of a motor vehicle comprising:

a drive gear, first and second rotationally symmetric stamped housing parts, impressed bearing projections for mounting a differential pin, and axle drive shafts extending transversely with respect to the differential pin and having a rotational axis, wherein the first housing part is made in the form of a bearing part provided with a jacket extending at a substantially continuous incline relative to the rotational axis and having a section with the impressed bearing projections for mounting the differential pin, wherein the drive gear is mounted on a flange of the first housing part which surrounds an opening facing the second housing part, and wherein said second housing part includes a cover for said opening with said second housing part inserted into said opening and said cover connected to a radially inwardly facing annular surface of the flange.

2. An arrangement according to claim 1, wherein the first and second housing parts are configured such that during different rotational speeds of axle drive shafts, forces acting on a differential gear nonrotatably mounted on one of these drive shafts and acting in the direction of the rotational axis abut a first radially extending supporting surface of the first housing part.

3. An arrangement according to claim 1, wherein the flange is spaced radially further away from the rotational axis than the impressed bearing projections for the differential pin.

4. An arrangement according to claim 2, wherein a second radially extending supporting surface facing the differential pin is provided on the second housing part for accommodating a second differential gear.

5. An arrangement according to claim 3, wherein an additional supporting surface facing the differential pin is provided on the cover for accommodating a second differential gear.

6. An arrangement according to claim 1, wherein the first housing part has a first bearing seat on a radially inward section thereof for supporting the first housing part, said first bearing seat extending parallel to the rotational axis.

7. An arrangement according to claim 2, comprising a third housing part formed as a sleeve which is held on the first housing part adjacent to a supporting surface and has a first bearing seat which supports the first and third housing parts and extends parallel to the rotational axis.

8. An arrangement according to claim 4, wherein the second housing part is substantially conically shaped in cross section, whereby on a first bevel of the second housing part 4 a bearing seat extending parallel to the rotational axis is provided to support the second housing part, said second housing part including a second bevel which has an additional support surface, wherein a connecting area of the first and second bevels is connected with an inner surface of the flange of the first housing part.

9. An arrangement according to claim 4, wherein the second housing part has a bearing seat extending parallel to the rotational axis to support the second housing part, on which bearing seat a bevel extending from the bearing seat to an inner surface of the flange of the first housing part is formed.

10. An arrangement according to claim 9, wherein an angular insert is located in the vicinity of the bevel, on which insert an additional supporting surface is formed.

11. An arrangement according to claim 2, wherein the differential gear as well as compensating gears meshing therewith are arranged at a distance from the first supporting surface and an inner surface of the jacket, and wherein the resultant space is filled with an initially liquid plastic.

12. An arrangement according to claim 1, wherein the drive gear is permanently mounted on the flange.

13. An arrangement according to claim 3, wherein the cover is permanently mounted on the first housing part.

14. An arrangement according to claim 13, wherein a connection between the cover and the first housing part is made by a laser weld.

15. An arrangement according to claim 3, wherein a bushing associated with the first housing part is permanently mounted on the first housing part.

16. An arrangement according to claim 15, wherein the connection between the bushing and the first housing part is made by friction welding.

17. An arrangement according to claim 1, wherein the second housing part is substantially conically shaped in cross section, whereby on a first bevel of the second housing part a bearing seat extending parallel to the rotational axis is provided to support the second housing part, said second housing part including a second bevel which has an additional support surface, wherein a connecting area of the first and second bevels is connected with an inner surface of the flange of the first housing part.

* * * * *